United States Patent
Wong

(10) Patent No.: US 9,122,678 B2
(45) Date of Patent: Sep. 1, 2015

(54) METHOD AND SYSTEM FOR RECOMMENDING ENTERPRISE COLLABORATION DATA

(71) Applicant: Business Objects Software Ltd., Dublin (IE)

(72) Inventor: Joseph Wong, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 272 days.

(21) Appl. No.: 13/705,580

(22) Filed: Dec. 5, 2012

(65) Prior Publication Data

US 2014/0156688 A1 Jun. 5, 2014

(51) Int. Cl.
*G06F 17/30* (2006.01)

(52) U.S. Cl.
CPC ................................ *G06F 17/30002* (2013.01)

(58) Field of Classification Search
CPC ................................................. G06F 17/30002
USPC ........................................................... 707/758
See application file for complete search history.

(56) References Cited

U.S. PATENT DOCUMENTS

| | | | |
|---|---|---|---|
| 6,266,649 B1* | 7/2001 | Linden et al. | 705/7.29 |
| 8,538,829 B1* | 9/2013 | Hu et al. | 705/26.1 |
| 2001/0021914 A1* | 9/2001 | Jacobi et al. | 705/8 |
| 2002/0198882 A1* | 12/2002 | Linden et al. | 707/10 |
| 2003/0105682 A1* | 6/2003 | Dicker et al. | 705/27 |
| 2010/0191582 A1* | 7/2010 | Dicker et al. | 705/10 |
| 2011/0184977 A1* | 7/2011 | Du et al. | 707/769 |
| 2012/0151377 A1* | 6/2012 | Schultz et al. | 715/751 |
| 2012/0278127 A1* | 11/2012 | Kirakosyan et al. | 705/7.29 |
| 2013/0138671 A1* | 5/2013 | Cleaver et al. | 707/758 |

OTHER PUBLICATIONS

"Vector space", Wikipedia®, [Online]. Retrieved from the Internet: <URL: http://en.wikipedia.org/w/index.php?title=Vector_space&oldid=525195997>, (Accessed Nov. 30, 2012). 36 pgs.

"Vector Space Model", Wikipedia®, [Online]. Retrieved from the Internet: <URL: http://en.wikipedia.org/wiki/Vector_space_model>, (Accessed Jul. 13, 2012), 4 pgs.

Resnick, P., et al., "Recommender Systems", Communications of the ACM, vol. 40, No. 3, (Mar. 1997), 56-58.

* cited by examiner

*Primary Examiner* — Joshua Bullock
(74) *Attorney, Agent, or Firm* — Schwegman Lundberg & Woessner, P.A.

(57) ABSTRACT

The suggestions of objects in a real-time collaboration tool can be accomplished by first forming a first vector representing an object utilized in the real-time collaboration tool. The vector can then be compared to a plurality of vectors representing a plurality of objects stored in a database to locate one or more vectors similar to the first vector. One or more of the plurality of objects stored in the database can be recommended to a user of the real-time collaboration tool based on the comparing.

10 Claims, 15 Drawing Sheets

FIG. 4

METHOD AND SYSTEM FOR
RECOMMENDING ENTERPRISE
COLLABORATION DATA

TECHNICAL FIELD

This document generally relates to systems and methods for use with enterprise collaboration data. More specifically, this document relates to methods and systems for creating and utilizing a recommendation system for enterprise collaboration data.

BACKGROUND

Enterprise collaboration tools allow multiple users within an enterprise, such as a business, to collaborate on data, projects, meetings, decisions, and the like. Real-time collaboration allows the users to, in real time, analyze and modify data, plan meetings, and make and analyze decisions related to the enterprise.

BRIEF DESCRIPTION OF DRAWINGS

The present disclosure is illustrated by way of example and not limitation in the figures of the accompanying drawings, in which like references indicate similar elements and in which:

FIG. 4 is a diagram illustrating a screen capture, in accordance with an example embodiment, of a real-time collaboration tool.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, dynamically updated recommendations may be made regarding objects (e.g., content, user profiles and interconnections thereof) within a collaboration tool. These suggestions may be updated in real-time as the user's content changes and also as the set of suggestible objects changes.

Figure 1:
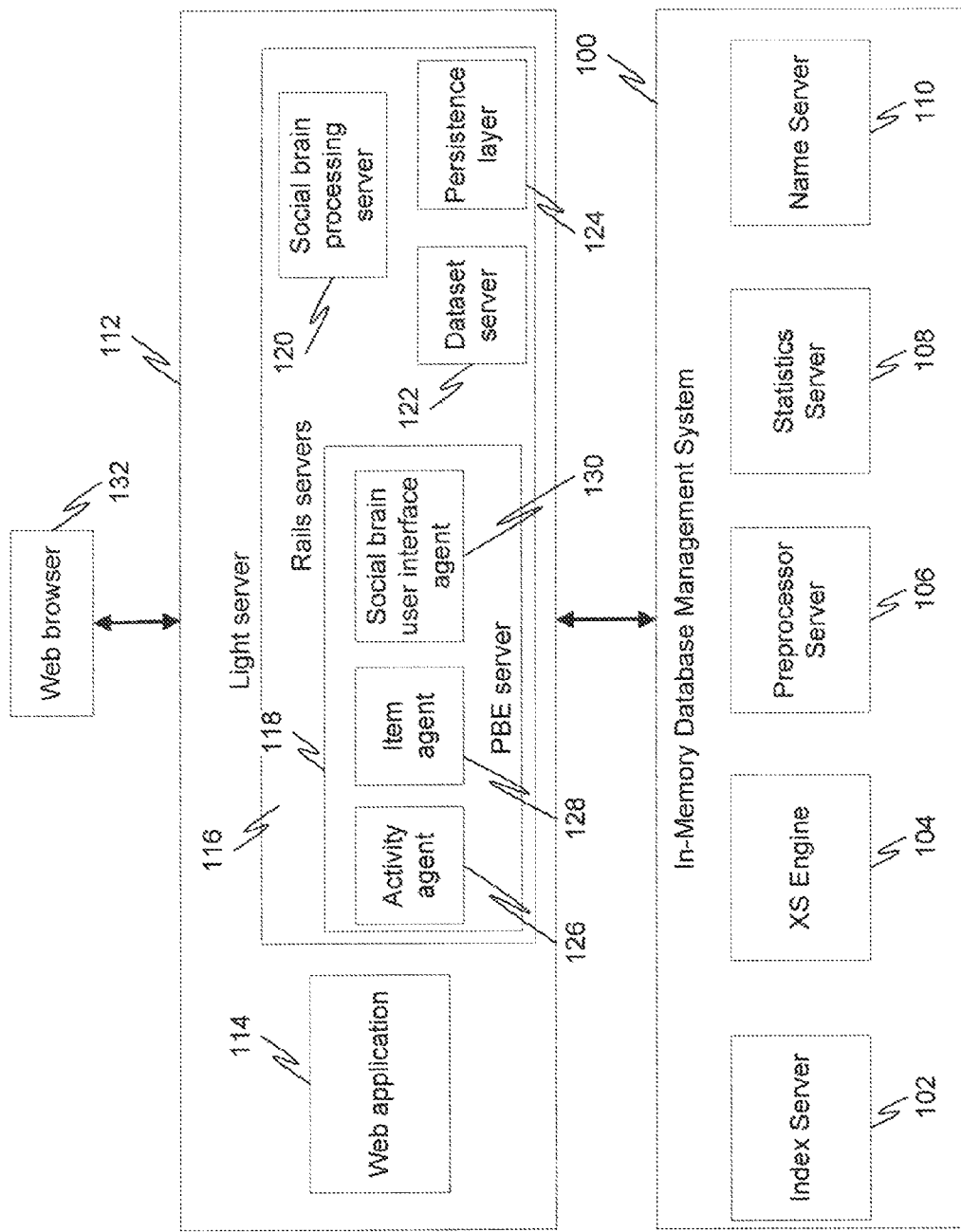
FIG. 1 is a diagram illustrating a system, in accordance with an example embodiment, to perform object recommendation.

In some embodiments, the recommendations may be made using an in-memory database management system. FIG. 1 is a diagram illustrating a system, in accordance with an example embodiment, to perform object recommendation. An in-memory database is a database management system that primarily relies on main memory for computer data storage. It is contrasted with database management systems that employ a disk storage mechanism. One example of an in-memory database is the SAP HANA system from SAP AG of Walldorf, Germany. It should be noted that this is merely one embodiment of a system that can be utilized with the methods described herein, and is not intended to be limiting.

Here, an in-memory database system 100 to be provided includes an index server 102, an eXternal Subroutine (XS) Engine 104, a preprocessor server 106, a statistics server 108, and a name server 110. These components may operate on a single computing device, or may be spread among multiple computing devices (e.g., separate servers). Note that the XS Engine is merely one example of a suitable engine in this environment.

In an example embodiment, the index server 102 contains the actual data and the engines for processing the data. It also coordinates and uses all the other servers. In an example embodiment, a specialized social brain application database is maintained in the index server 102 to store information relevant to making recommendations of objects to users, as will be described in more detail later. The name server 110 holds information about the database topology. This is used in a distributed system with instances of the database on different hosts. The name server 110 knows where the components are running and which data is located on which server.

The statistics server 108 collects information about status, performance, and resource consumption from all the other server components. The preprocessor server 106 is used for analyzing text data and extracting the information on which the text search capabilities are based.

The XS engine 104 allows clients to connect to the database system 100 using HyperText Transfer Protocol (HTTP).

Figure 2:
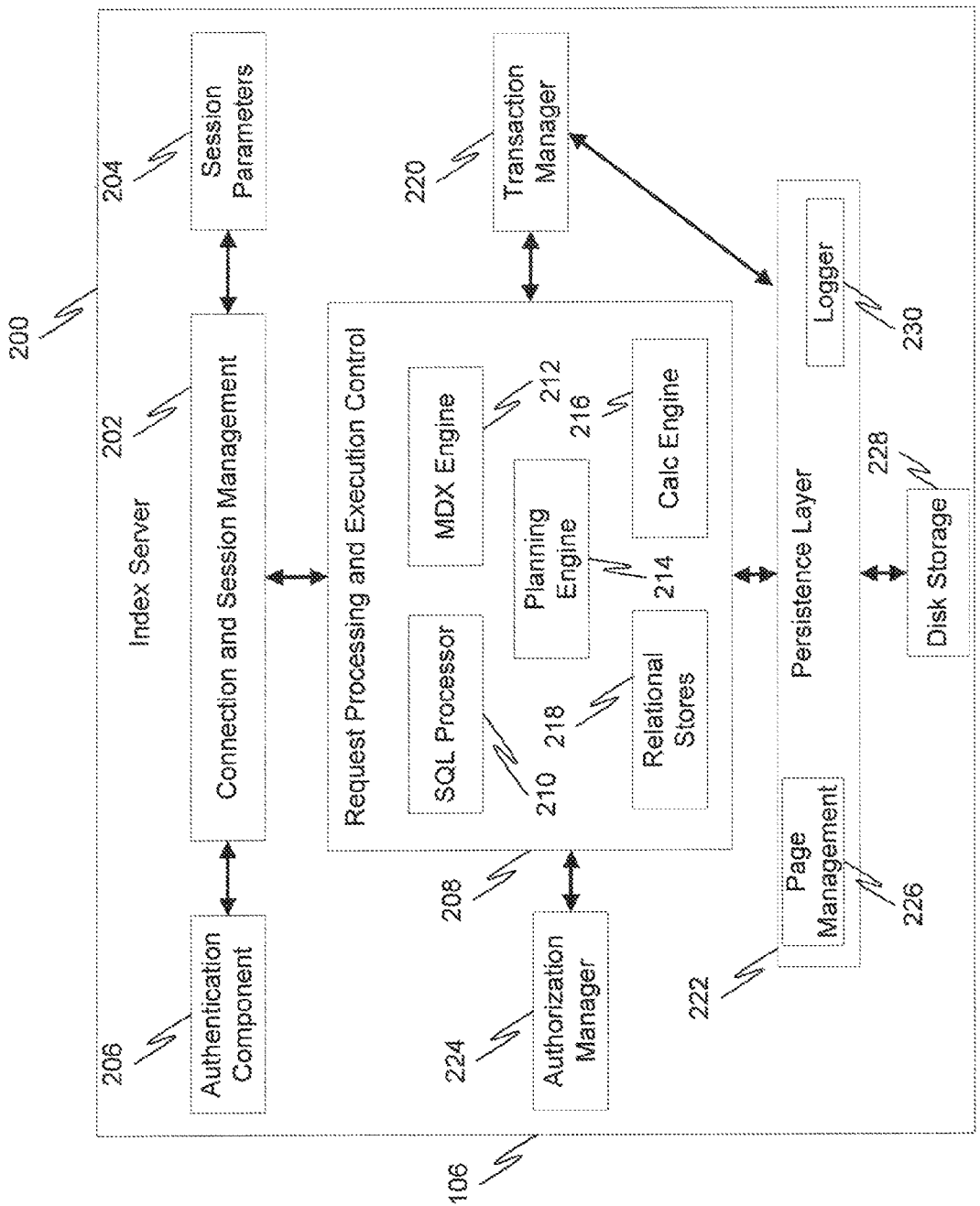
FIG. 2 is a diagram illustrating an index server, in accordance with an example embodiment.

FIG. 2 is a diagram illustrating an index server, in accordance with an example embodiment. The index server may, in some embodiments, be utilized as the index server 102 in the system of FIG. 1. The index server 200 includes a connection and session management component 202, which is responsible for creating and managing sessions and connections for the database clients. Once a session is established, clients can communicate with the database system (e.g., database system 100 of FIG. 1) using SQL statements. For each session, a set of session parameters 204 may be maintained, such as autocommit, current transaction isolation level, and the like. Users are authenticated either by the database system itself (e.g., login with user name and password, using authentication component 206), or authentication can be delegated to an external authentication provider such as a Lightweight Directory Access Protocol (LDAP) directory.

The client requests can be analyzed and executed by a set of components summarized as request processing and execution control 208. The SQL processor 210 checks the syntax and semantics of the client SQL statements and generates a logical execution plan. MultiDimensional eXpressions (MDX) is a language for querying and manipulating multidimensional data stored in Online Analytical Processing (OLAP) cubes, or the like. As such, an MDX engine 212 is provided to allow for the parsing and executing of MDX commands. A planning engine 214 allows financial planning applications to execute basic planning operations in the database layer. One such operation is to create a new version of a dataset as a copy of an existing dataset, while applying filters and transformations.

A calc engine 216 implements the various SQL scripts and planning operations. The calc engine 216 creates a logical execution plan for calculation models derived from SQL script, MDX, planning, and domain-specific models. This logical execution plan may include, far example, breaking up a model into operations that can be processed in parallel.

The data is stored in relational stores 218, which implement a relational database in main memory.

Each SQL statement may be processed in the context of a transaction. New sessions are implicitly assigned to a new transaction. The transaction manager 220 coordinates database transactions, controls transactional isolation, and keeps track of running and closed transactions. When a transaction is committed or rolled back, the transaction manager 220 informs the involved engines about this event so they can execute actions. The transaction manager 220 also cooperates with a persistence layer 222 to achieve atomic and durable transactions.

An authorization manager 224 is invoked by other database system components to check whether the user has the privileges to execute the requested operations. The database system allows for the granting of privileges to users or roles. A privilege grants the right to perform a specified operation on a specified object.

The persistence layer 222 ensures that the database is restored to the most recent committed state after a restart and that transactions are either completely executed or completely undone. To achieve this goal in an efficient way, the persistence layer 222 uses a combination of write-ahead logs, shadow paging, and save points. The persistence layer 222 also offers a page management interface 226 for writing and reading data to a separate disk storage 228, and also contains a logger 230 that manages the transaction log. Log entries can be written implicitly by the persistence layer 222 when data is written via the persistence interface or explicitly by using a log interface.

Figure 3:
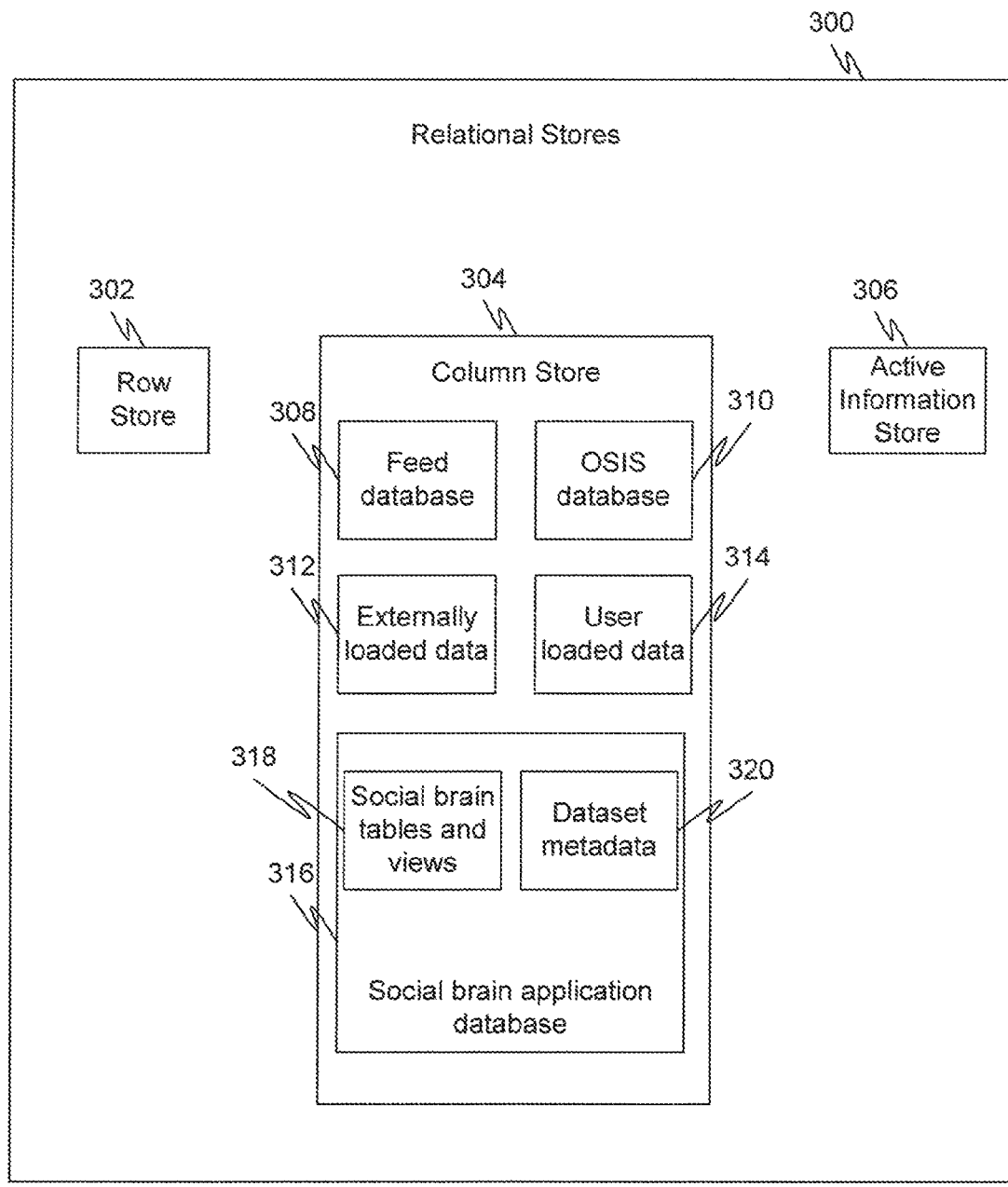
FIG. 3 is a diagram illustrating relational stores, in accordance with an example embodiment.

FIG. 3 is a diagram illustrating relational stores, in accordance with an example embodiment. The relational stores 300 may include is row store 302, a column store 304, and an active information store 306. The column store 304 may include a number of databases, including feed database 308, Open Shared Identity Service (OSIS) database 310, externally loaded data 312, user loaded data 314, and a social brain application database 316. The social brain application database 316 may include social by tables and views 318, used to store information about the social brain aspects described below, and dataset metadata 320.

Referring back to FIG. 1, the in-memory database system 100 may interface with a light server 112, such as a light Java server. The light server 112 may include a web application 114 as well as various rails servers 116. The rails servers 116 may include a Presence-Based Editing (PBE) server 118, a social brain processing sever 120, a dataset server 122, and a persistence layer 124. The PBE server 118 may include an activity agent 126, an item agent 128, and a social brain user interface agent 130.

The web application 114 may interface with a client web browser 132.

Figure 4:
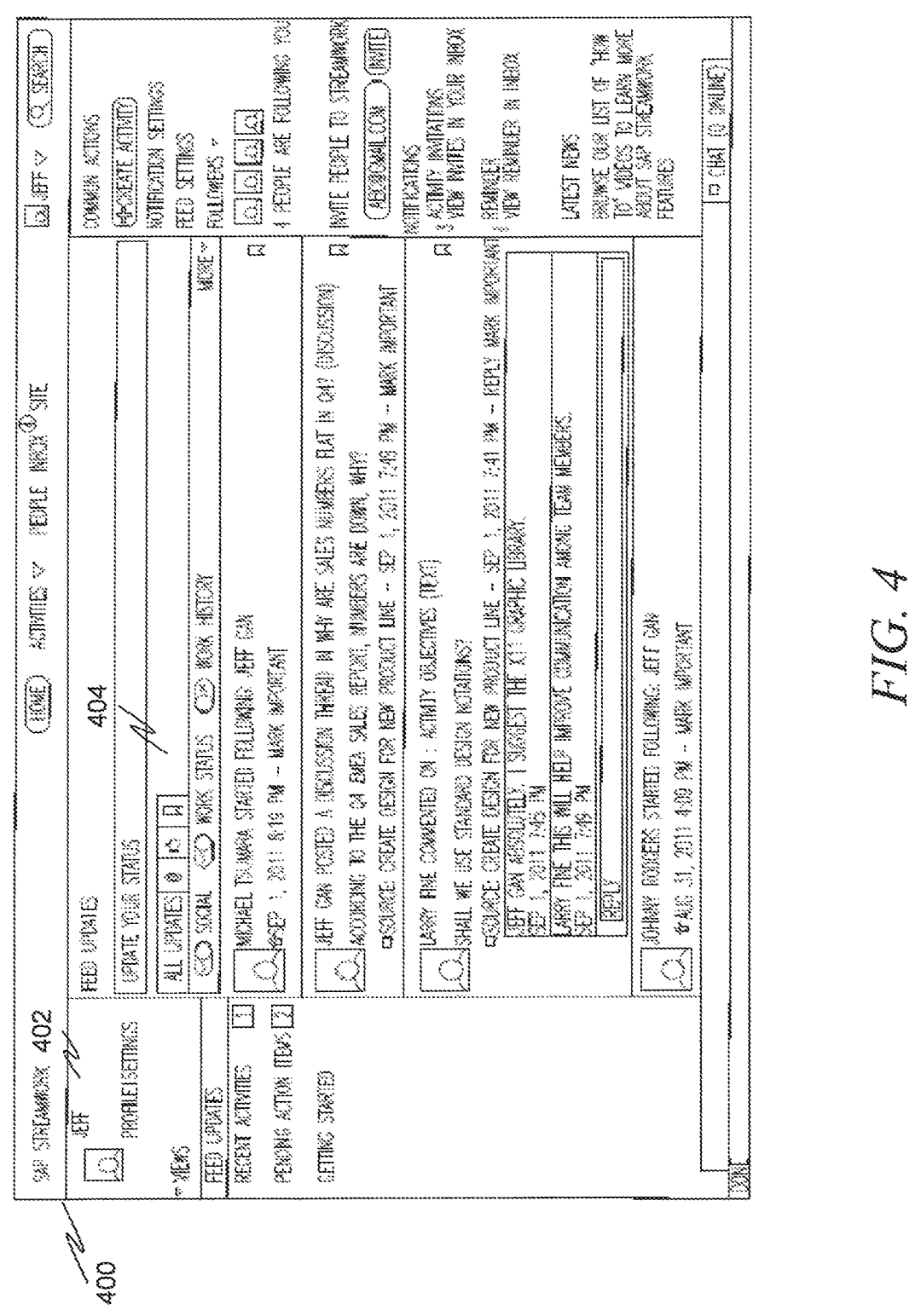

FIG. 4 is a diagram illustrating a screen capture, in accordance with an example embodiment, of a real-time collaboration tool. A user interlace 400 may be provided where a user, such as user 402, can collaborate with other users. Depicted here is a feed 404, where postings of potential relevance to the user are presented in feed 404. In some embodiments, the feed refreshes periodically and in others the refresh is event driven. The feed 404 can be reverse chronological order, or a modified order allowing for filtering, aggregating, promotion of postings, and the like.

Figure 5:
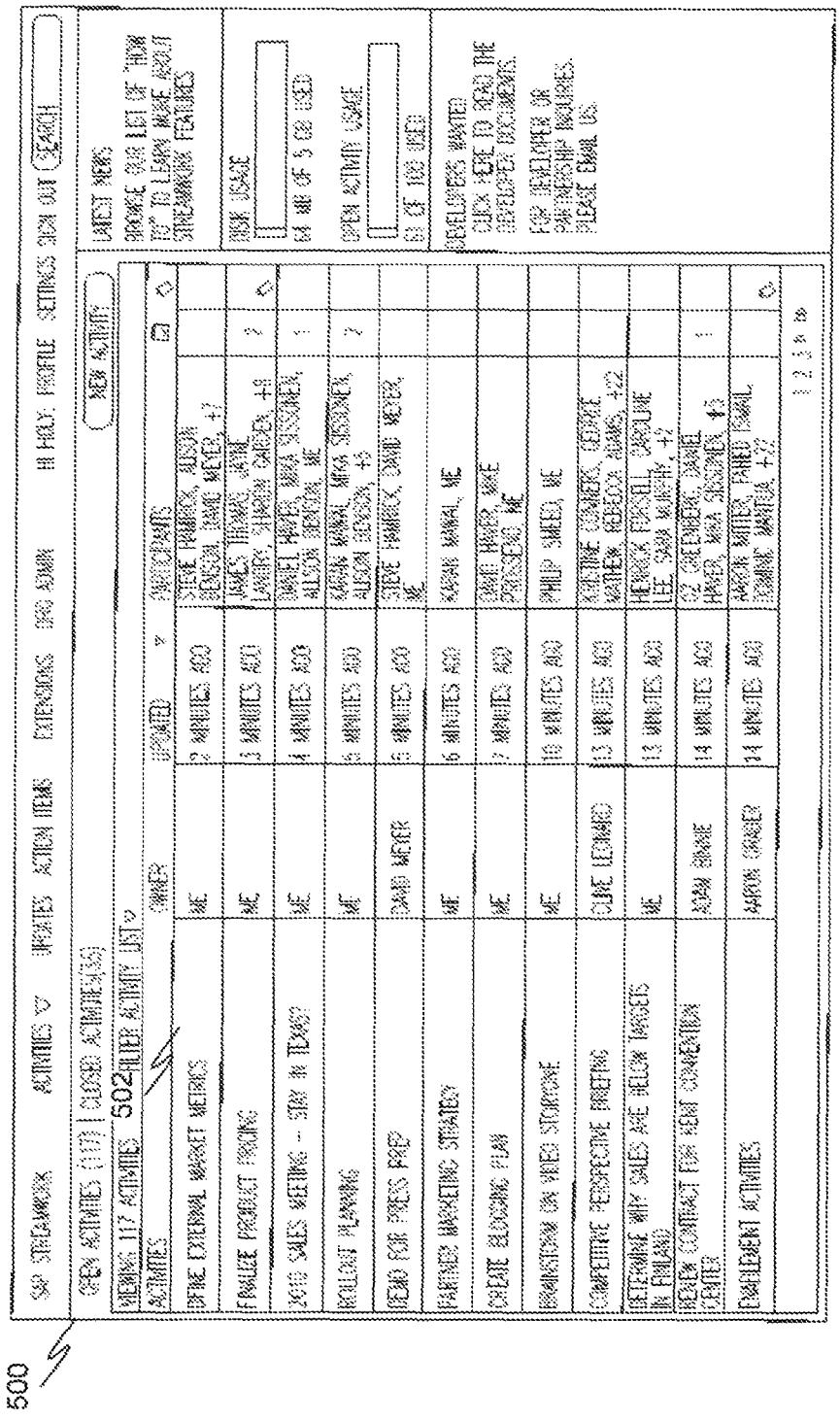
FIG. 5 is a diagram illustrating another screen capture, in accordance with an example embodiment, of the real-time collaboration tool.

FIG. 5 is a diagram illustrating another screen capture, in accordance with an example embodiment, of the real-time collaboration tool. The user interface 500 includes an area where activities 502, such as tasks used to complete a project, may be displayed to the user. The term "real-time" should be interpreted to mean that the collaboration occurs in a runtime environment for multiple users, with changes from one user immediately (but not instantaneously, of course, given delays inherent in computing devices) being reflected to other users.

Figure 6:
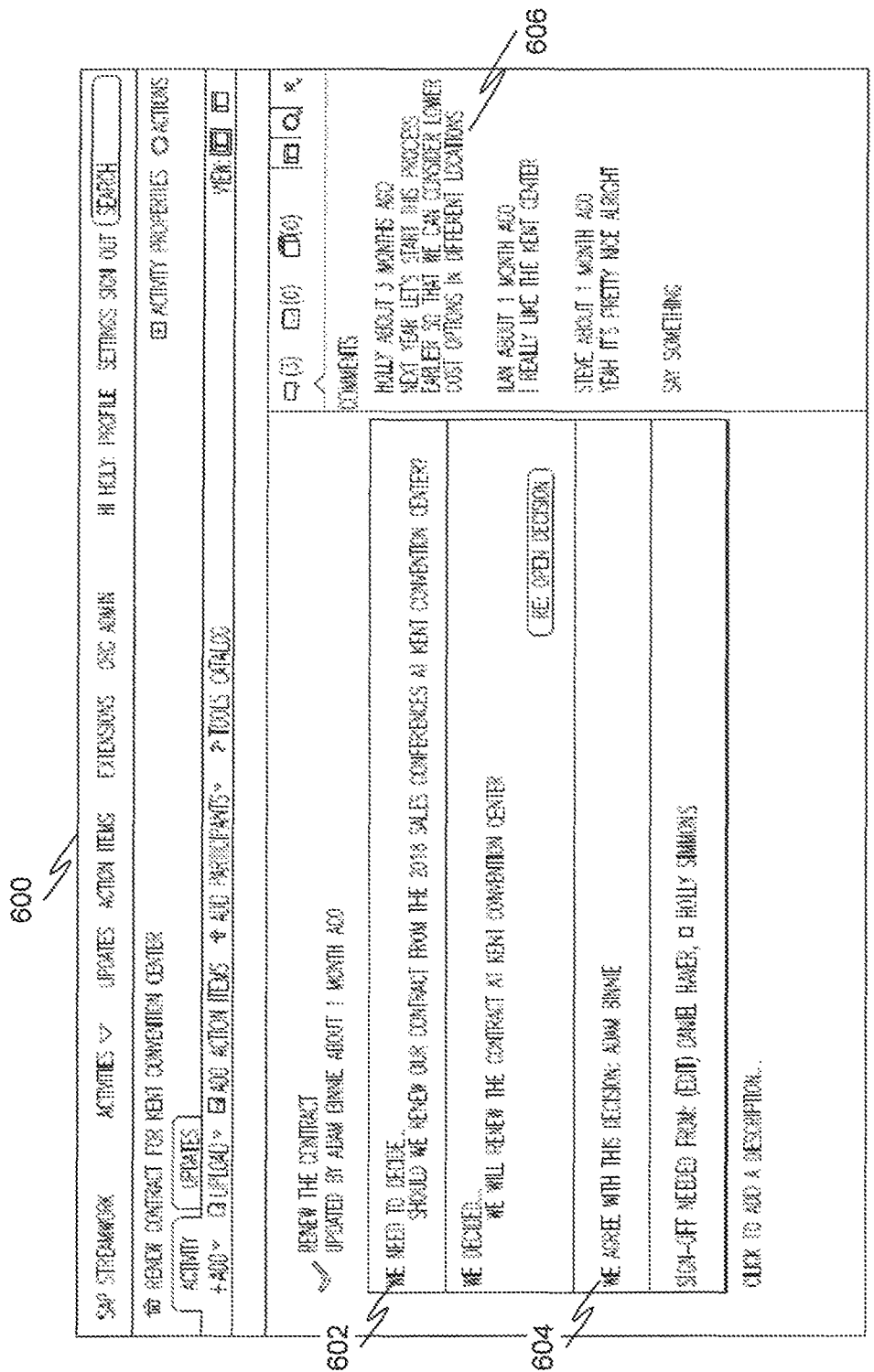
FIG. 6 is a diagram illustrating another screen capture, in accordance with an example embodiment, of the real-time collaboration tool.

FIG. 6 is a diagram illustrating another screen capture, in accordance with an example embodiment, of the real-time collaboration tool. Here the user has selected an individual activity. Thus, the user interface 600 includes information about the activity, such as decisions 602 that need to be made, an identification of users 604 needed to sign off on the decision, and comments 606.

Generally speaking, users of the real-time collaboration tool work in what is termed a workspace. The workspace includes all objects in which collaboration is occurring. This may include users, activities, content, comments, and so forth.

In an example embodiment, a real-time collaboration tool may be extended by providing real-time suggestions of objects based upon the context of the user. Real-time text analysis on the vast amount of user and system generated data in the real-time collaboration tool may be performed. Actionable suggestions that are relevant and in context may then be provided. These suggestions may be provided at the user's fingertips as the user performs actions in the real-time collaboration tool. Using an in-memory database management system can aid in ensuring that the suggestions are provided in real-time.

In another example embodiment, clustering algorithms are used to provide a relevance metric between different objects within the real-time collaboration tool. The term "objects" as used in this disclosure is intended to broadly over any item within the tool that can be the subject of a recommendation. This may include, for example, users, activities, content (e.g., documents, videos), and the like. The relevance metric between objects can describe how closely "related" that the objects are. The objects in this comparison may either be of the same type (e.g., the metric defines how related two different users are) or of different types (e.g., the metric defines how related a user and an activity are).

Figure 7:
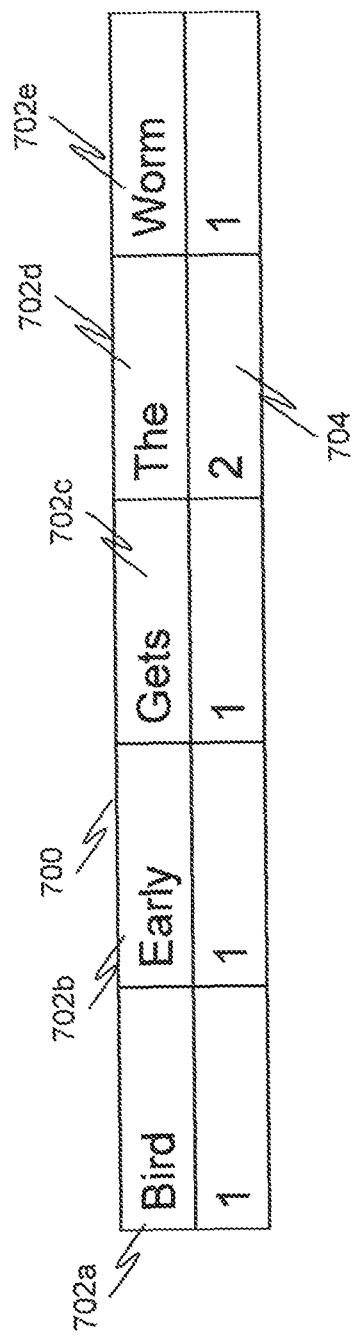
FIG. 7 is a diagram illustrating an example vector, in accordance with an example embodiment.

Relevance can broadly cover a number of different concepts, including comparing who created the item (e.g., the author of the content), when the item was created, the source of the content, and the content itself. For each pair of objects in the real-time collaboration tool, a metric may be defined that informs as to how similar they are. A vector space model may be used to model each piece of textual information about the object as a vector of words, where each dimension is a distinct word, and the coefficient at each dimension is the number of times the word occurred in the text. FIG. 7 is a diagram illustrating an example vector, in accordance with an example embodiment. Here, the vector 700 corresponds to the sentence "The early bird gets the worm." As can be seen, the vector includes a column for each word 702a-702e, The word "the" appears in the sentence twice, hence the value in the column for "the" 702d is "2" 704. The other words only appear once in the sentence and hence only show a value of "1."

Vector algebra can be used to show that the angle between two vectors indicates how similar the corresponding pieces of text are. In some embodiments, angles are compared. In some embodiments, it is easier to work with the cosine of the angle as follows:

$$\cos\theta = \frac{a \cdot b}{|a||b|}$$

where a, b are vectors and a·b represents an inner product, for example, the dot product of the two. Further |a| and |b| are a norm to assign a length to the vectors a and b. For example, the L2-norm, or Euclidean norm, of the vectors a and b. In other words these examples combine to yield a formula for the angle:

$$\cos\theta = \frac{\sum_{i=0}^{n} a_i b_i}{\sqrt{\sum_{i=0}^{n} a_i^2 \sum_{i=0}^{n} b_i^2}}$$

When the cosine value is 0, this means that the vectors are orthogonal and have no words in common. When the value is 1, the vectors align, that is, are identical modulo scaling factors. Thus, the cosine value, between 0 and 1, can be used to score how similar two pieces of text are from two different objects.

In some embodiments, calculating the vectors based directly on words in the text can result in less than perfect efficacy. For example, English language words may have multiple word forms, which may appear different. For example, singular words may appear different than plural words. Likewise, words in the past test may look different from words in the present tense (e.g., "eat" vs. "ate"). Another example is that some words may have more importance than others. Articles, such as "the," "a," and "an" are typically unimportant in determining the similarity of content in a sentence to another sentence, and thus may be weighted lower than, for example, nouns. Another example is that common and uncommon words, if given the same weight, could result in, for example, a common noun being attributed the same weight as proper nouns. Proper nouns, however, are more likely to be relevant to the meaning of a sentence and thus in some embodiments should be weighted higher.

Specific algorithms may be provided to handle the above situations. For example, to deal with different word forms, all words in a piece of content may first be normalized by stemming, which involves converting the word to its root form. Thus, the plural "words" may be converted, to "word" and the past tense "ate" may be converted to "eat."

In order to handle different kinds of words, parts-of-speech identification may be used to identify that the words are of a certain type (e.g., article, noun, verb), with a weighting applied to each type.

To handle common and uncommon words, Term Frequency Inverse Document Frequency (TF-IDF) may be applied. This divides the weight of a word by how commonly the word appears in the corpus of all documents in the system. TF-IDF is a technique to score or rank the relevance of items which are treated as documents. In TF-IDF, an item that includes rare terms that matches the rare terms in a query will be given more weight than an item includes common terms that matches the common terms in the query. In some example embodiments, TF-IDF is proportional to the product of term frequency and inverse document frequency. In some example embodiments, term frequency is a measure proportional to a count of the number of occurrences of a term in an item. In some example embodiments, the term frequency is inversely proportional to item length (measured by, for example, word count) to effect a normalization with respect to item length. In some example embodiments, the inverse document frequency is proportional to number of documents in a corpus. In some embodiments, the inverse document frequency is inversely proportional to number of documents in the corpus containing the term.

Figure 8:
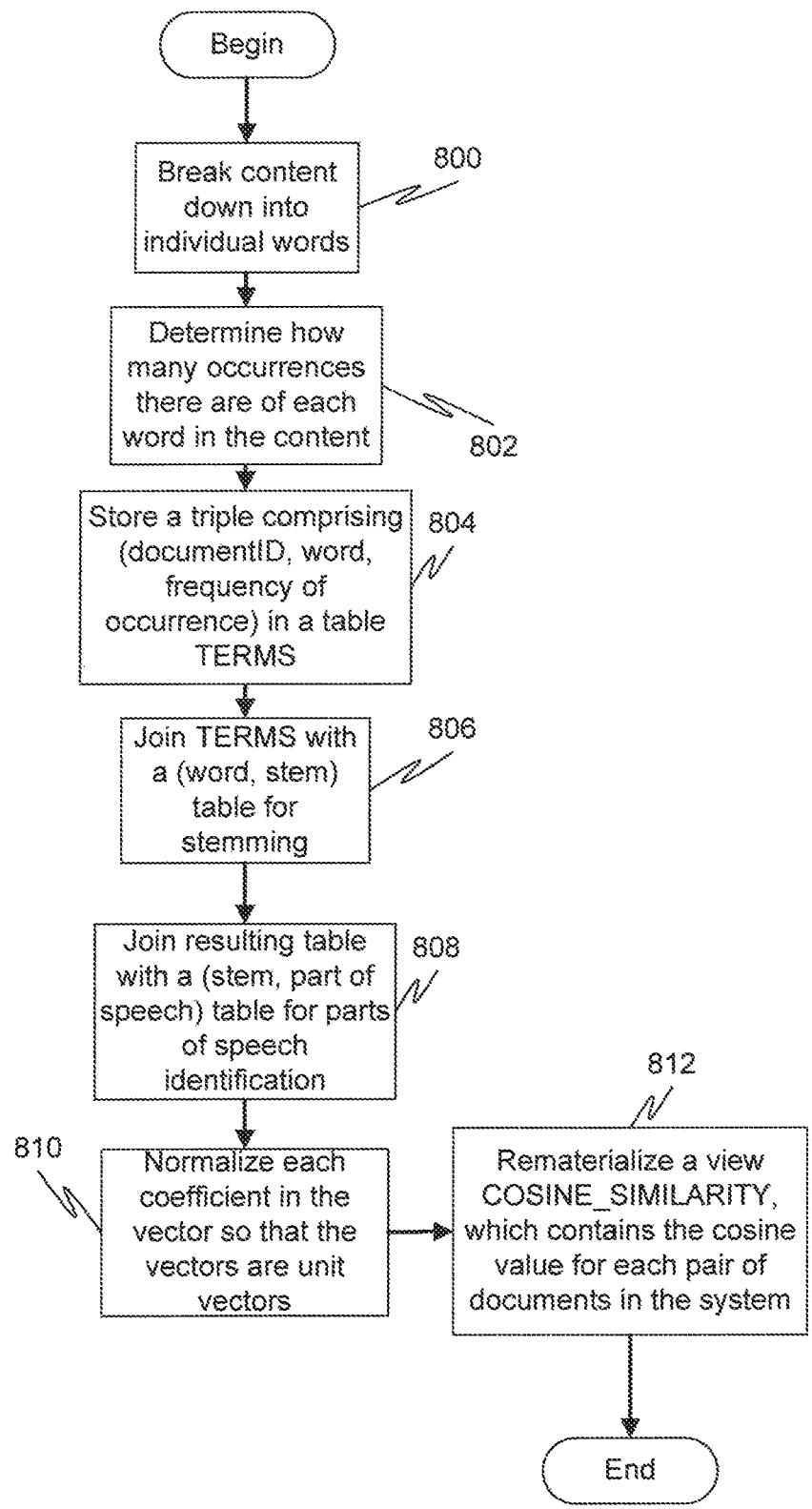
FIG. 8 is a flow diagram illustrating a method, in accordance with an example embodiment, of persisting a new piece of content.

FIG. 8 is a flow diagram illustrating a method, in accordance with an example embodiment, of persisting a new piece of content. At 800, the content may be broken down into individual words. At 802, it may be determined how many occurrences there are of each word in the content. At 804, a triple comprising (documentID, word, frequency of occurrence) can be stored in a table. This table may be called TERMS. A set of views may then be rematerialized based on joins between TERMS and other tables. At 806, TERMS may be joined with a (word, stem) table for stemming. At 808, the resulting table may be joined with a (stem, part of speech) table for parts of speech identification. At 810, the resulting table may then be joined with a (stem, global frequency) table for TF-IDF. At 810, each coefficient may be normalized in the vector so that the vectors are unit vectors. This allows the cosine to be computed by simply calculating the inner product of the vectors of the two pieces of content, without having to divide against the norms of the vectors. At 812, a view COSINE_SIMILARITY may be rematerialized, which contains the cosine value for each pair of documents in the system.

It should be noted that while the above description describes an embodiment using the English language, other languages may also be encompassed in the tables. There is no requirement that the documents being compared be of the same language. Indeed, tables allowing for the translation of words from different languages would allow the system to normalize the comparisons, even though some of the objects are constructed in a different language than English.

Metrics may be further aggregated at the level of activities and users. By analyzing the user's current actions, it is also possible to provide user-intent-based suggestions based on the changes in item relevance that result from those actions.

Activities and users can be considered as composite documents (or sets of atomic documents). An activity may be considered to be any object and comment in the activity, whereas a user may be any object and comment made by the user. Thus, an aggregate metric can be established between activities and between activities and users.

Various different aggregation strategies can be used to aggregate what is effectively a matrix of coefficients. Examples may include summation, component-wise maximum, and root-mean square. In an example embodiment, a different strategy may be used for different scenarios. For example, if a user is to be recommended, a sum of squares can be performed over all of the user's content, based on the maximum cosine value between each piece of user content and all the items in the activity. For recommending an item (i.e., an individual piece of content), a maximum cosine value over all items in the current activity and a particular item may be performed. For recommending an activity based on another activity, a root-mean square may be performed over the cosine values computed between all pairs of items between the two activities.

In an example embodiment, an effort is made to detect the user's current intent, and this intent is used to make future recommendations. Intent can be inferred by determining what the user is currently doing. A delta may be measured between the current and previous set of recommendations, and treat modify the current recommendations based on current intent. The delta reflects the differences between the current and previous set of recommendations, and can be used to aid in determining "what the user is doing". For example, if a recommendation is removed after the user performs an act, then it may be assumed that further similar recommendations may be removed if the user performs similar acts, and as such it may be preferable to assume the user will perform those similar acts (or at least weight the recommendations accordingly).

The recommendations provided to a user of the workspace are based not just on actions by the user or on items worked on by the user, but on all objects in the workspace, including other users in the workspace, activities engaged in by other users in the workspace, and items worked on by other users in the workspace (even when those items themselves are not currently located in the workspace).

Figure 9:
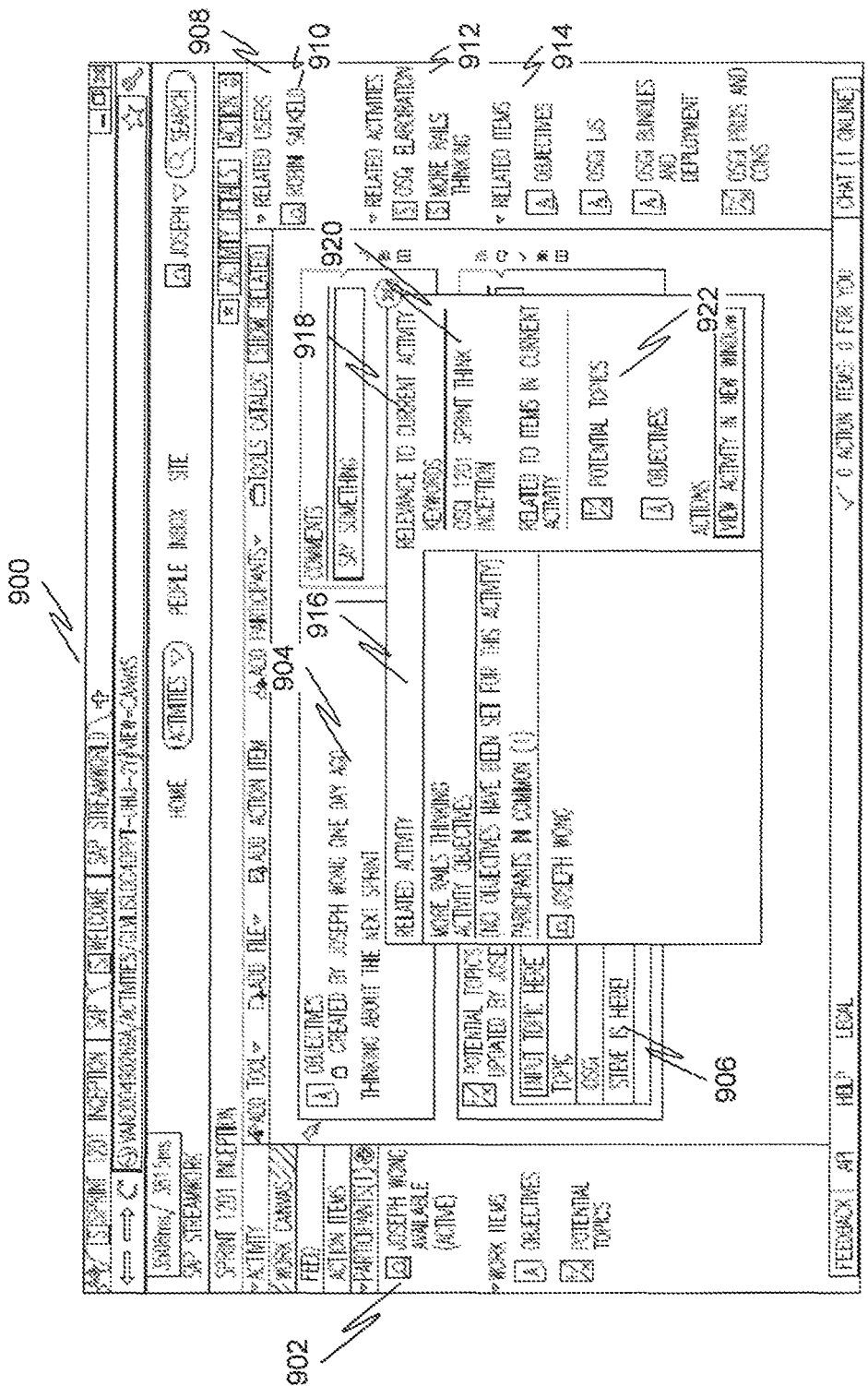
FIG. 9 is a diagram illustrating a screen capture, in accordance with an example embodiment, of a real-time collaboration tool.

FIG. 9 is a diagram illustrating a screen capture, in accordance with an example embodiment, of a real-time collaboration tool. As can be seen, within the user interface 900, a single user 902 currently participates in a workspace (here entitled "Sprint 1201 Inception"). This may include creating and modifying objectives 904, creating and identifying potential topics 906, creating documents, and the like. As the user 902 engages in these activities, various objects may be recommended to the user as potentially being relevant to this workspace. These objects are recommended in area 908. These recommended objects may include users 910, activities 912, and items (content) 914. Area 908 may be dynamically updated in real-time as the user 902 performs actions in the real-time collaboration tool. As other users are added to the workspace, the actions of those other users also influence the recommendations in area 908, even when the particular user 902 seeing the user interface at the moment is not engaging in any new actions. Here, the user 902 has selected one of the recommended activities 912, resulting in window 916 displaying more information about the selected activity, including information 918 about why the activity was recommended. This information 918 includes keywords 920 that the activity has in common with objects in the workspace, as well as an indication of individual objects 922 in the workspace to which the item is most relevant.

Figure 10:
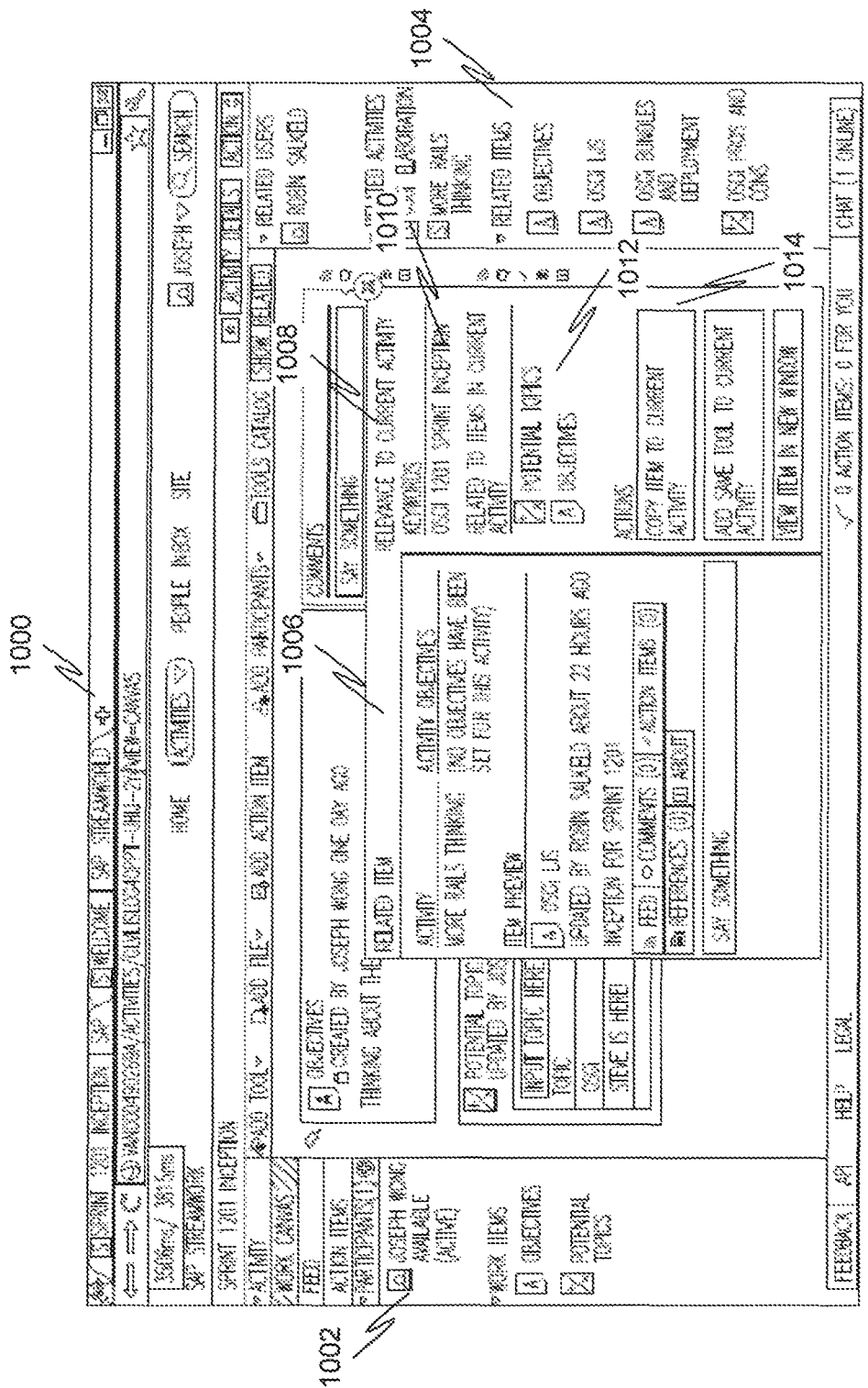
FIG. 10 is a diagram illustrating another screen capture, in accordance with an example embodiment, of the real-time collaboration tool.

FIG. 10 is a diagram illustrating another screen capture, in accordance with an example embodiment, of the real-time collaboration tool. As can be seen, within the user interface 1000, the user 1002 has selected one of the related items 1004. This brings up a window 1006 where additional information about the related item is displayed, including information 1008 about why the item was recommended. This information 1008 include keywords 1010 that the item has in common with objects in the workspace, as well as an indication of to which particular objects 1012 in the workspace the item is most relevant. Through a menu of actions 1014, the user 1002 is able to, for example, add the item to the workspace.

Figure 11:
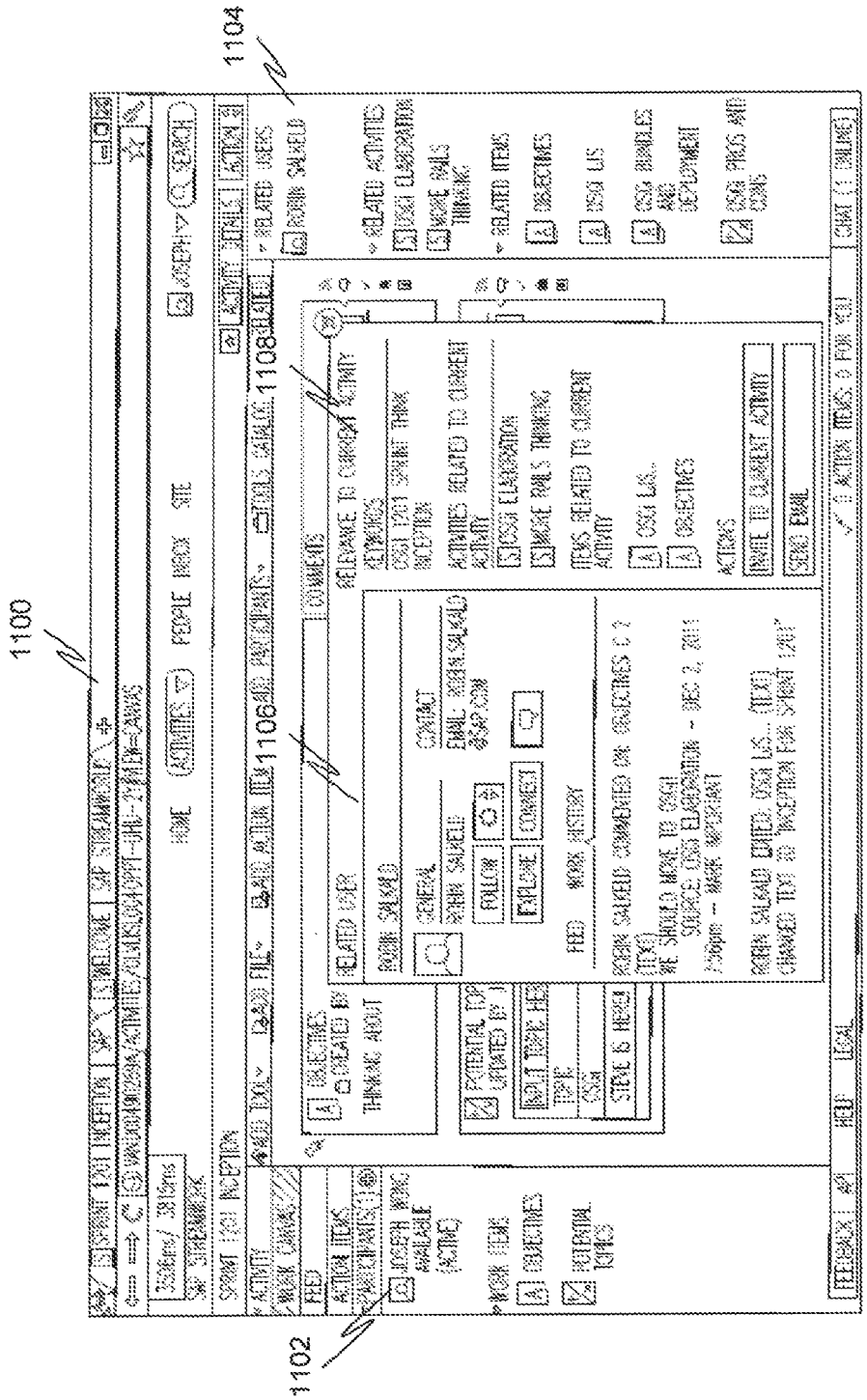
FIG. 11 is a diagram illustrating another screen capture, in accordance with an example embodiment, of the real-time collaboration tool.

FIG. 11 is a diagram illustrating another screen capture, in accordance with an example embodiment, of the real-time collaboration tool. As can be seen, within the user interface 1100, the user 1102 has selected one of the recommended users 1104. This brings up a window 1106 where additional information about the related user is displayed, including information 1108 about why the item was recommended.

Figure 12:
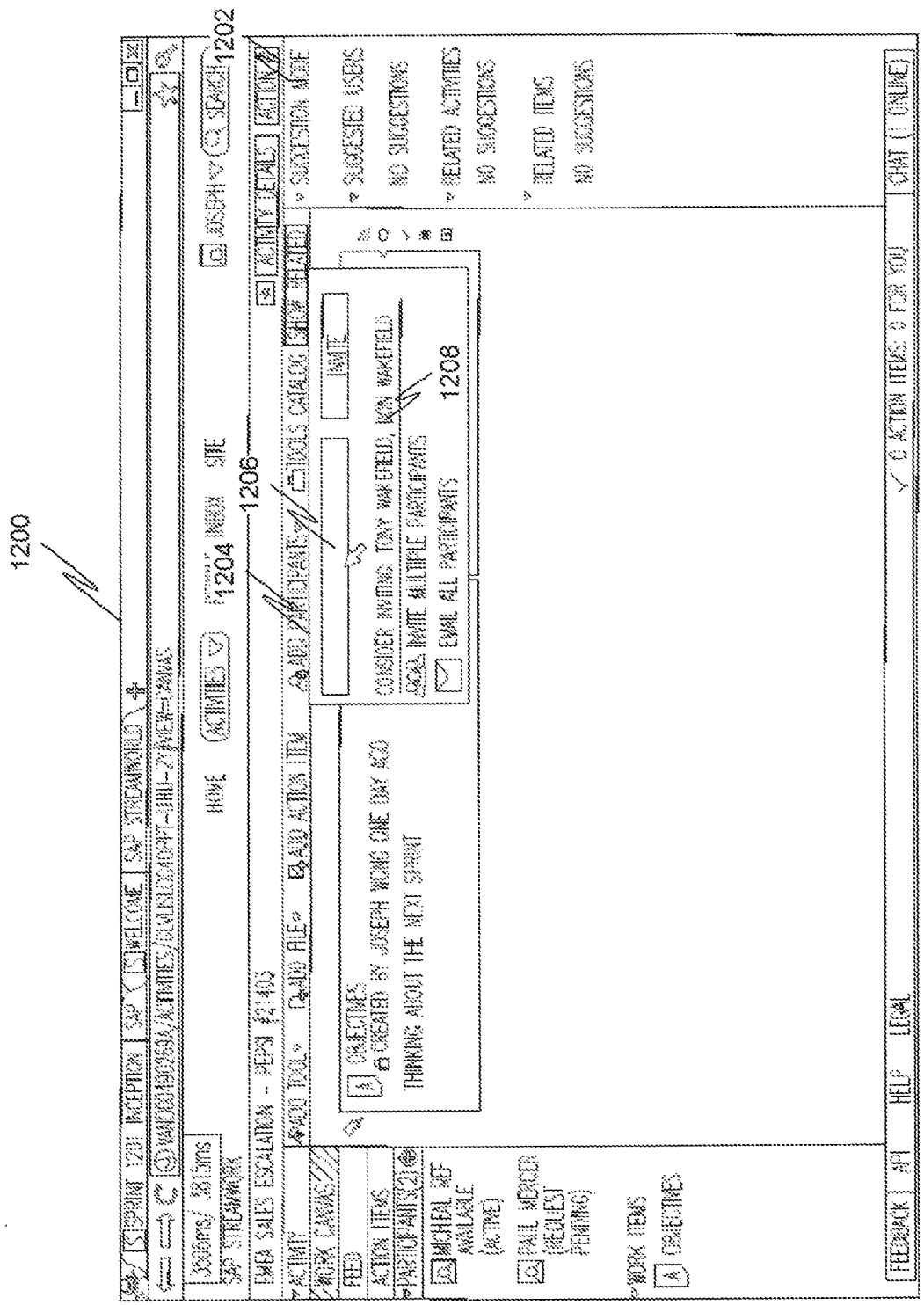
FIG. 12 is a diagram illustrating another screen capture, in accordance with an example embodiment, of the real-time collaboration tool.

FIG. 12 is a diagram illustrating another screen capture, in accordance with an example embodiment, of the real-time collaboration tool. This figure depicts a user interface 1200 with another mechanism whereby recommendations can be made. Instead of, or in addition to, the recommended objects area 1202, recommendations can be made in other menus. Here, the user has opened an "add participants" menu item 1204. Ordinarily, this menu item 1204 would simply include an input field 1206 where the user could enter the name of another user to add to the workspace. Here, however, a recommendation of one or more additional users 1208 is displayed within the menu item 1204.

Figure 13:
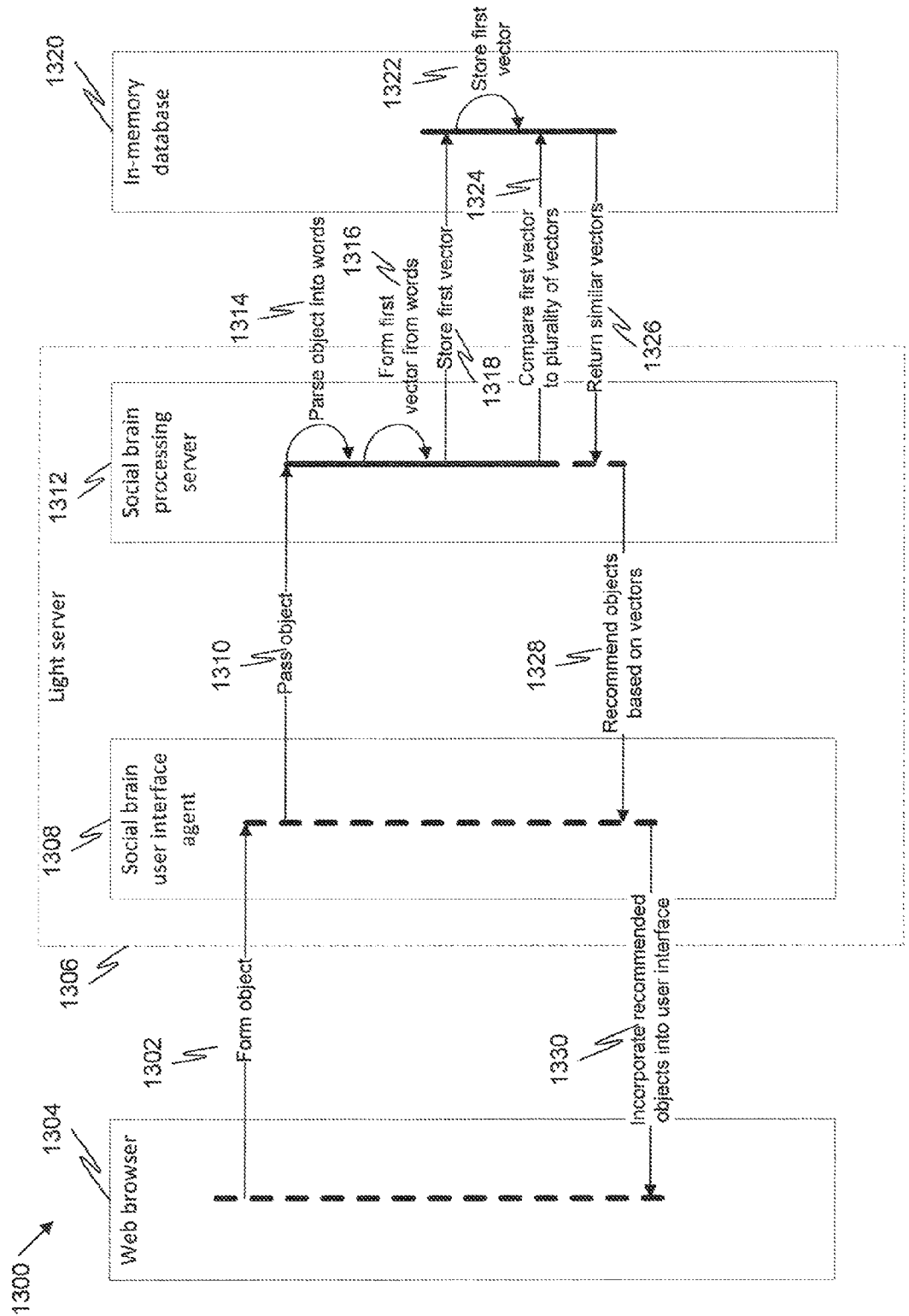
FIG. 13 is an interaction diagram illustrating a method, in accordance with an example embodiment, to perform the suggestion of objects in a real-time collaboration tool.

FIG. 13 is an interaction diagram illustrating a method, in accordance with an example embodiment, to perform the suggestion of objects in a real-time collaboration tool. As shown, and in various embodiments, the processing is substantially asynchronous. That is a call from a client to server or server to server is non-blocking. The method 1300 begins at 1302, when a user on a web browser 1304 forms an object on a light server 1306. A social brain user interface agent 1308 on the light server 1306 intercepts this object. At 1310, the social brain user interface agent 1308 passes the object to a social brain processing server 1312, also located on the light server 1306. At 1314, the social brain processing server 1312 parses the object into words. At 1316, the social brain processing server 1312 forms a first vector representing the words of the object. At 1318, the social brain processing server 1312 sends the first vector to an in-memory database 1320 for storage. At 1322, the in-memory database stores the first vector. At 1324, the social brain processing server 1312 compares the first vector to a plurality of vectors representing a plurality of objects stored in the in-memory database 1320. In various embodiments, the processing in in-memory database 1320 is synchronous. The result is that is one or more vectors similar to the first vector are returned at 1326. At 1328, the social brain processing server 1312 recommends one or more of the plurality of objects stored in the in-memory database 1320 based on the returned vectors, by sending the recommendations to the social brain user interface agent 1308, which then incorporates the recommendations into a user interface it presents at 1330 to the user via the web browser 1304.

Figure 14:
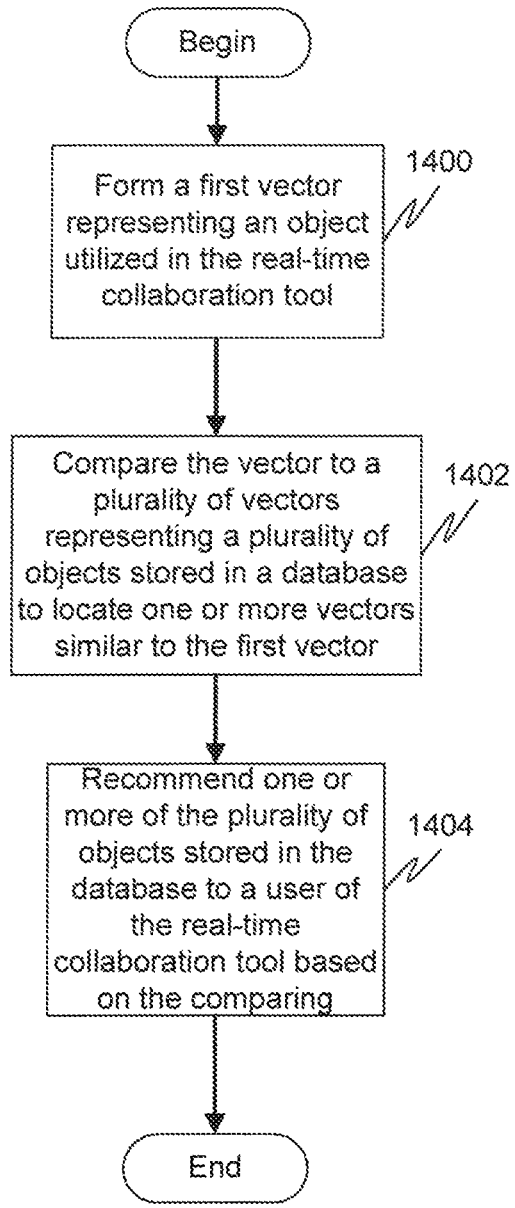
FIG. 14 is a flow diagram illustrating a method, in accordance with an example embodiment, to perform the suggestion of objects in a real-time collaboration tool.

FIG. 14 is a flow diagram illustrating a method, in accordance with an example embodiment, to perform the suggestion of objects in a real-time collaboration tool. At 1400, a first vector representing an object utilized in the real-time collaboration tool is formed. At 1402, the vector is compared to a plurality of vectors representing a plurality of objects stored in a database to locate one or more vectors similar to the first vector. At 1404, one or more of the plurality of objects stored in the database are recommended to a user of the real-time collaboration tool based on the comparing.

Figure 15:
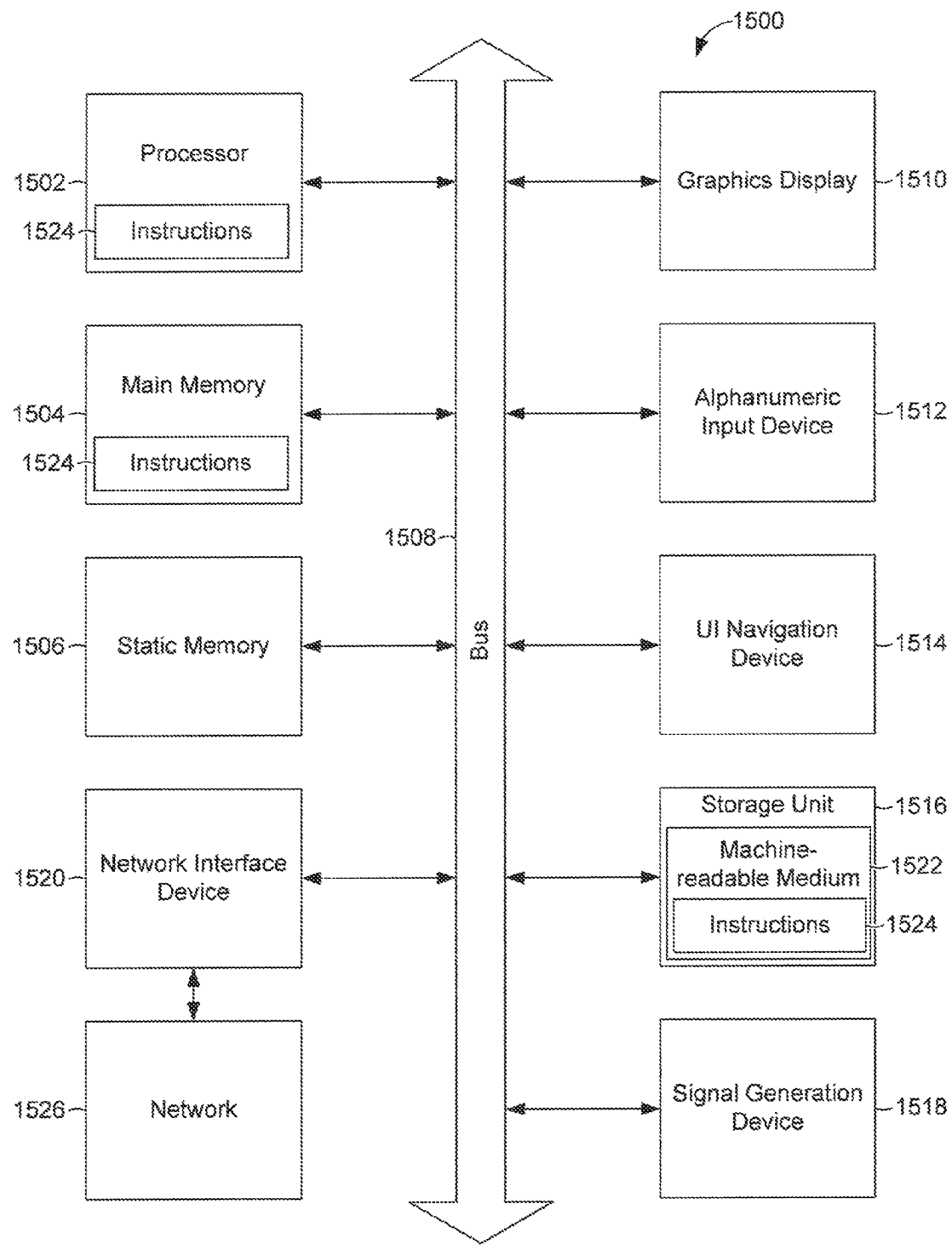
FIG. 15 is a block diagram of a computer processing system at a server system, within which a set of instructions for causing the computer to perform any one or more of the methodologies discussed herein may be executed.

FIG. 15 is a block diagram of a computer processing system at a server system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, aSet-Top Box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1500 includes processor 1502 (e.g., a Central Processing Unit (CPU), a Graphics Processing Unit (GPU) or both), main memory 1504 and static memory 1506, which communicate with each other via bus 1508. The processing system 1500 may further include graphics display 1510 (e.g., a plasma display, a Liquid Crystal Display (LCD) or a Cathode Ray Tube (CRT)). The processing system 1500 also includes alphanumeric input device 1512 (e.g., a keyboard), a User Interface (UI) navigation device 1514 (e.g., a mouse, touch screen, or the like), a storage unit 1516, a signal generation device 1518 (e.g., a speaker), and a network interface device 1520.

The storage unit 1516 includes machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the processing system 1500, with the main memory 1504 and the processor 1502 also constituting computer-readable, tangible media.

The instructions 1524 may further be transmitted or received over network 1526 via a network interface device 1520 utilizing any one of a number of well-known transfer protocols (e.g., HTTP).

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions 1524. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of suggesting objects in a real-time collaboration tool, the method comprising:
forming a first vector representing an object utilized in the real-time collaboration tool;
comparing the vector to a plurality of vectors representing a plurality of objects stored in a database to locate one or more vectors similar to the first vector, the comparing including, for each vector in the plurality of vectors stored in the database, calculating a measure proportional to an inner product of the first vector and the vector from the plurality of vectors stored in the database, divided by a product of norms of each of the first vector and the vector from the plurality of vectors stored in the database; and recommending one or more of the plurality of objects stored in the database to a user of the real-time collaboration tool based on the comparing.

2. The method of claim 1, wherein the objects stored in the database include a user.

3. The method of claim 1, wherein the objects stored in the database include an activity.

4. The method of claim 1, wherein the objects stored in the database include content.

5. The method of claim 1, wherein the recommending includes, when one of the one or more recommended objects is selected by a user, displaying information as to why the selected object was recommended.

6. The method of claim 5, wherein the displaying information includes displaying keywords in common between the selected object and the first object.

7. The method of claim 5, wherein the displaying information includes displaying activities that are related to the selected object.

8. The method of claim 5, wherein the displaying information includes displaying objects related to the selected object.

9. A non-transitory computer-readable storage medium comprising instructions that, when executed by at least one processor of a machine, cause the machine to perform operations to suggest objects in a real-time collaboration tool, the operations comprising:

forming a first vector representing an object utilized in the real-time collaboration tool;

comparing the vector to a plurality of vectors representing a plurality of objects stored in a database to locate one or more vectors similar to the first vector, the comparing including, for each vector in the plurality of vectors stored in the database, calculating a measure proportional to an inner product of the first vector and the vector from the plurality of vectors stored in the database, divided by a product of norms of each of the first vector and the vector from the plurality of vectors stored in the database; and recommending one or more of the plurality of objects stored in the database to a user of the real-time collaboration tool based on the comparing.

10. The non-transitory computer-readable storage medium of claim 9, wherein the database is an in-memory database.

* * * * *